US00RE36622E

United States Patent [19]

Harker

[11] E Patent Number: Re. 36,622

[45] Reissued Date of Patent: Mar. 21, 2000

[54] DRYWALL FASTENER

[75] Inventor: Brian G. Harker, Granger, Ind.

[73] Assignee: Hilti Aktiengesellschaft, Schaan, Liechtenstein

[21] Appl. No.: 08/743,102

[22] Filed: Nov. 4, 1996

Related U.S. Patent Documents

Reissue of:

[64] Patent No.: 4,902,179
Issued: Feb. 20, 1990
Appl. No.: 07/070,897
Filed: Jul. 8, 1987

U.S. Applications:

[63] Continuation of application No. 07/839,361, Feb. 20, 1992, abandoned.

[51] Int. Cl.[7] ..... F16B 13/04

[52] U.S. Cl. ..... 411/21; 411/30; 411/33; 411/73; 411/428; 403/248

[58] Field of Search ..... 411/21, 30, 31, 411/29, 71, 73, 446–448, 428, 55, 32, 33, 60, 74–76, 479, 489, 61, 349; 403/248

[56] References Cited

U.S. PATENT DOCUMENTS

| | | | |
|---|---|---|---|
| 67,071 | 7/1867 | Postawka | 411/448 |
| 843,271 | 2/1907 | Hanlon | 411/21 |
| 895,769 | 8/1908 | Kohnstamm | 411/71 |
| 1,108,483 | 8/1914 | Abramson | 411/448 |
| 1,112,557 | 10/1914 | Read | 411/55 |
| 1,118,544 | 11/1914 | Galligan | 411/29 |
| 1,236,538 | 8/1917 | Brown | 411/21 X |
| 2,751,052 | 6/1956 | Flora | 411/446 X |
| 2,924,876 | 2/1960 | Lewis | 411/428 X |
| 3,232,163 | 2/1966 | Croessant | 411/73 X |
| 3,269,251 | 8/1966 | Bass | 411/21 |
| 3,283,567 | 11/1966 | Fietz | 411/21 X |
| 3,437,004 | 4/1969 | Pacharis | 411/29 |
| 3,651,734 | 3/1972 | McSherry . | |
| 3,983,779 | 10/1976 | Dimas | 411/447 |
| 4,174,910 | 11/1979 | McSherry et al. . | |
| 4,181,061 | 1/1980 | McSherry . | |
| 4,221,154 | 9/1980 | McSherry . | |
| 4,322,194 | 3/1982 | Einhorn | 411/71 X |
| 4,500,238 | 2/1985 | Vassiliou . | |
| 4,566,832 | 1/1986 | Mirsberger et al. | 411/21 |
| 4,596,503 | 6/1986 | Mirsberger et al. | 411/32 |

FOREIGN PATENT DOCUMENTS

| | | | |
|---|---|---|---|
| 148882 | 3/1937 | Austria | 411/21 |
| 19652 | 1/1915 | France | 411/437 |
| 537592 | 3/1922 | France | 411/71 |
| 1207065 | 12/1965 | Germany | 411/71 |
| 1936360 | 3/1970 | Germany | 411/21 |
| 321386 | 3/1970 | Sweden | 411/428 |
| 457981 | 8/1968 | Switzerland | 411/21 |
| 556979 | 12/1974 | Switzerland | 411/73 |
| 979470 | 1/1965 | United Kingdom | 411/71 |
| 2038979 | 7/1980 | United Kingdom | 411/29 |
| 2051995 | 1/1981 | United Kingdom | 411/71 |

OTHER PUBLICATIONS

Star 12 Plastic Anchors Packaging Material.
The Wall Grabber Packaging Material.
Toggler Plastic Wall Anchors Packaging Material.
Picture of Hollow Wall Drive.

*Primary Examiner*—Lloyd A. Gall
*Attorney, Agent, or Firm*—Anderson, Kill & Olick, P.C.

[57] ABSTRACT

A drive-in expansion fastener is provided having a generally cylindrical, hollow body with a tapered end formed from an angular truncation of the body. The body is reinforced by at least one longitudinal rib so as to permit drive-in penetration from the tapered end even if the fastener is formed from plastic materials. The fastener is retained within the wall by at least one pair of hinged flanges which expand *or move* circumferentially *apart* in response to the threaded insertion of an ordinary screw within the hollow portion of the body. That screw engages an inclined surface within the body to cam the flanges outwardly. The flanges engage the back surface of the wall while a longitudinally [slit portion] *split length* of the body expands within the hole created by drive-in penetration.

38 Claims, 1 Drawing Sheet

DRYWALL FASTENER

Matter enclosed in heavy brackets [ ] appears in the original patent but forms no part of this reissue specification; matter printed in italics indicates the additions made by reissue.

*This is a continuation application of Ser. No. 07/839,361, filed Feb. 20, 1992, now abandoned, which is a reissue application of U.S. Pat. No. 4,902,179, issued on Feb. 20, 1990.*

BACKGROUND AND SUMMARY OF THE INVENTION

The present invention relates generally to article-supporting fasteners and, more particularly, to expansion fasteners as are used with drywall or similar plaster boards in building construction.

Numerous different expansion fasteners are known. These devices are often used to retain pictures, ornaments or other articles directly to the interior building wall. These walls are typically nailed or glued to skeletal frame members of the building and subsequently covered with paint or wallpaper. Once so covered, it is usually difficult to locate the underlying frame members. Thus, drywall fasteners tend to rely only upon the support strength of the drywall board itself.

Two general types of drywall expansion fasteners are known: those that require prior drilling or punching through the wall to permit fastener insertion, and those that are self-penetrating in that they may be directly hammered, punched or screwed into the wall. The latter type of fasteners are typically referred to as "drive-in fasteners" and tend to be preferred since they permit quicker installation. However, prior drive-in fasteners frequently cannot support the same loads as fasteners using preformed holes since the act of penetrating the wall within drive-in fasteners tends to create a blow out on the back side of the wall.

Blow outs are believed to result from the fact that prior drive-in fasteners pushed the wall material aside and forward during penetration. This displaced material appears to weaken the adjacent wall structure and create a larger opening at the side of the wall opposite the initial penetration of the fastener. A typical blow out situation is shown in FIG. 1. Fastener 10 (shown only in part) penetrated wall 12 from left to right. The initial penetration opening has a width of I. The opening created by the blow out has a significantly larger width B. As a result, load support within the walls for the fastener is available only for a distance L where the width of the hole closely corresponds to the width of fastener 10. As a general rule, the larger L becomes, the more load the fastener can support.

Blow outs can also be a problem for fasteners using pre-formed holes, but, for example, careful drilling can minimize the occurrence of blow outs. Unfortunately, such drilling is time-consuming and, especially where a large number of fasteners are needed, can result in significantly higher construction costs.

Construction costs are also affected by the price of the fastener itself. To retain the fastener in the wall, a portion of the fastener which has penetrated the wall often expands so as to prevent the fastener from being withdrawn from the hole created in the wall. This expansion can occur within the hole or past the hole on the back side of the wall. The mechanisms which create this expansion are sometimes elaborate and can significantly increase fastener production costs.

Typically, it is also important not to create bulges in the wall surrounding the fastener when expanding the fastener to retain it in the wall. These bulges can be unsightly and can structurally weaken the wall. Thus, stress control in fastener expansion can be critical. At the same time, since such controlled expansion is often accomplished by threaded rotation of elements within the fastener, the fastener should be fixed so as to avoid relative rotation with respect to the wall when these elements are adjusted.

Mechanisms for controlled fastener expansion are often expensive and require specially formed parts. Some prior fasteners have been constructed to reduce those costs by permitting expansion adjustment, through ordinary screws provided by the installer. Unfortunately, the torque required to insert those screws is frequently so high that installation of a number of those fasteners becomes overly tiring and/or time consuming. In addition, it is common that a particular fastener of that type will only accept one size screw. On the other hand, fasteners which are adjustable by extremely low threading torque sometimes give no indication of when the fastener has bottomed out and is fully engaged with the back of the wall. As a result, the installer may not realize when to stop threading and may cause serious damage to the wall, if threading too far, or inadequately secure the fastener, if not threading far enough.

It is, therefore, an object of the present invention to provide an improved expansion fastener which overcomes limitations in prior fasteners.

Another object is the provision of a drive-in fastener which avoids creation of blow outs in drywall and plaster boards.

A further object is to provide an inexpensive drive-in fastener which is readily secured within the wall.

Still another object is the provision of a reliable expansion fastener having expansion stress control during installation.

Yet another object is to provide an expansion fastener with increased load capacity in both wall and ceiling applications.

Still a further object is the provision of a drive-in expansion fastener which is easily threaded into place by ordinary screws of various sizes.

These and other objects of the present invention are attained by, the provision of a drive-in expansion fastener having a generally cylindrical, hollow body with a tapered end formed from an angular truncation of the body. The body is reinforced by at least one longitudinal rib so as to permit drive-in penetration from the tapered end even if the fastener is formed from plastic materials. The fastener is retained within the wall by at least one pair of hinged flanges which [expand] *move apart* circumferentially *when the fastener is expanded radially* in response to threaded insertion of an ordinary screw within the hollow portion of the body. That screw engages an inclined surface within the body to cam the flanges *radially* outwardly *and circumferentially apart*. The flanges engage the back surface of the wall while a longitudinally slit portion of the body expands within the hole created by drive-in penetration.

The present invention avoids blow outs by creating a clean cut through the board with the tapered end and receiving cut out debris within the fastener as the penetration is made. Thus, destructive stress within the wall beyond the penetration hole is minimized. The fastener can be molded from a self-lubricating nylon so as to minimize the necessary adjustment torque. Installation is completed when the screw is bottomed out against a thin, base shoulder on the front surface of the wall. Threading the adjustment screw primarily causes the hinged flanges to move *radially* outwardly *and circumferentially apart* along the back surface of the wall, rather than into it. Thus, bottoming out the screw on the base shoulder avoids creating bulges and undesired expansion stress within the wall.

Other objects, advantages and novel features of the present invention will now become readily apparent upon consideration of the following description of preferred embodiments in conjunction with the drawings.

DESCRIPTION OF THE PREFERRED EMBODIMENTS

Figure 1:
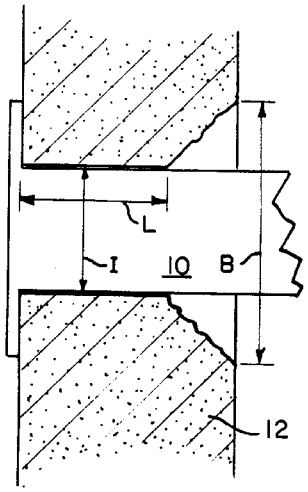
PRIOR ART FIG. 1
FIG. 1 shows a cross-sectional representation of a prior an arrangement wherein the drive-in fastener has caused a blow out in the wall.
Figure 6:
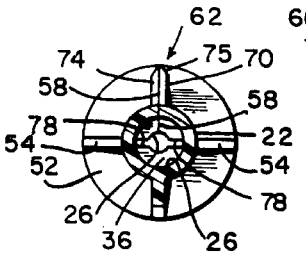
FIG. 6 shows a left end view of the expansion fastener taken along line 6—6 of FIG. 2.
Figure 7:
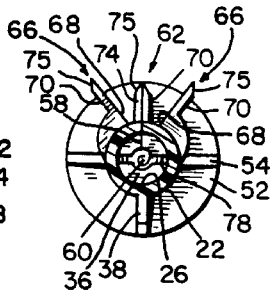
FIG. 7 shows a left end view of the expansion fastener taken line 6—6 of FIG. 2 after adjustment expansion.
Figure 2:
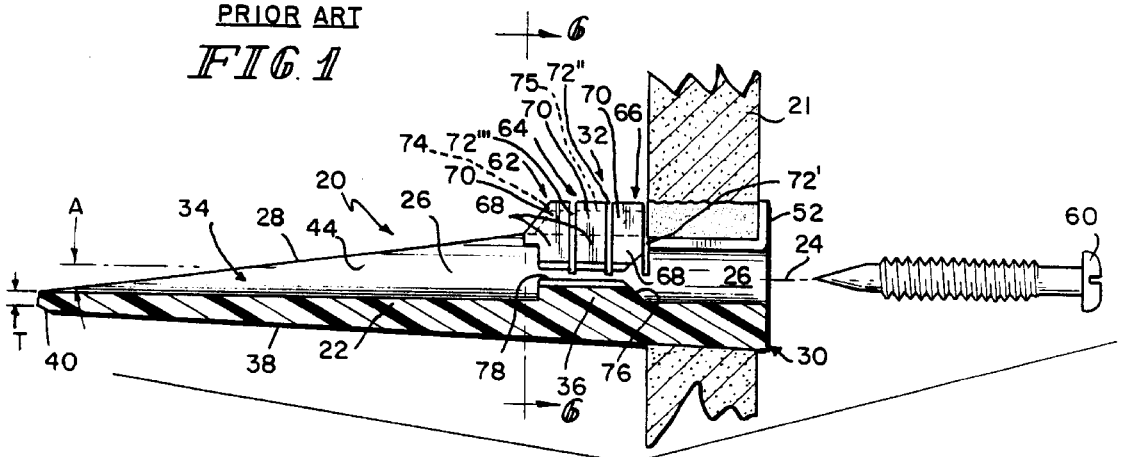
FIG. 2 shows a cross sectional view of an expansion fastener according to the present invention after initial wall penetration and prior to fastener expansion.

FIG. 2, which illustrates a preferred embodiment of the present invention, shows a drive-in expansion fastener 20 suitable for use with standard drywall boards. Fastener 20 can be driven into a drywall board or wall 21 by an ordinary hammer (not shown) without creating a blow out. As shown, the width of the hole through the wall closely corresponds to the width of the fastener for the entire length of that hole. It has been found that such fasteners can be properly molded from nylon plastics. One such commercially available material is "Rynite SST35". This material can presently be obtained from Nyloncraft, Inc., of Mishawaka, Indiana.

Fastener 20 includes a generally cylindrical body portion 22 which [preferrably] *preferably* extends along longitudinal axis 24. As shown, body portion 22 is hollow and is formed with passageway 26 extending from one end to the other. Tapered portion 28 is formed at one end of body portion 22, and base portion 30 is formed at the other end. Flanged portion 32, which serves to retain fastener 20 within the wall, is located between tapered portion 28 and base portion 30.

Tapered portion 28 is [preferrably] *preferably* created as an angular truncation of body portion 22. In visual effect, this truncation creates a slice or cut across body portion 22 at a slight angle A with respect to longitudinal axis 24. As shown, the truncation exposes passageway 26. Thus, in some respects tapered portion 28 resembles the tip of a hypodermic needle. Typically, angle A is less than 45 degrees. The specific angle used according to teachings of the present invention will depend upon the composition, density and thickness of the wall and the dimensions of fastener 20. Angle A is selected so as to facilitate a clean and gradual cut through the wall. A gradual cut is preferred so that substantially all the wall debris can be received within fastener 20 when penetrating the wall. As shown, with ordinary drywall boards and an initial passageway opening of approximately 0.17 inch (0.43 cm) in diameter, angle A is between 5 degrees and 10 degrees.

The wall debris is received during penetration in open portion 34 of passageway 26. In certain embodiments, the configuration of fastener 20 can exert compression stress on the wall as it is penetrating, but this stress is minimized by accumulating debris within fastener 20. In this manner, blow outs are avoided since the fastener does not simply plow through the wall. At the same time, passageway 26 includes a reduced diameter portion 36 which prevents that debris from interfering with expansion adjustment by a threaded screw or other retention element.

To reinforce body portion 22 and facilitate drive-in of fastener 20 when formed from plastic materials, longitudinal rib 38 is provided from base portion 30 to the end of tapered portion 28. Rib 38 is, for example, integrally molded with body portion 22 and tapers to decrease in thickness and/or width from base portion 30 to tapered portion 28.

Figure 3:
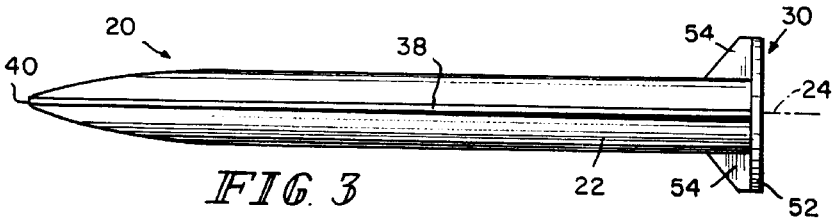
FIG. 3 shows a bottom elevational view of the expansion fastener of FIG. 2.
Figure 5:
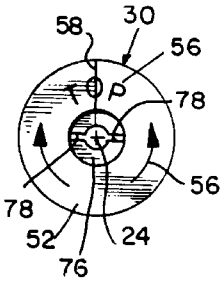
FIG. 5 shows a right end view of the expansion fastener of FIG. 2.
Figure 4:
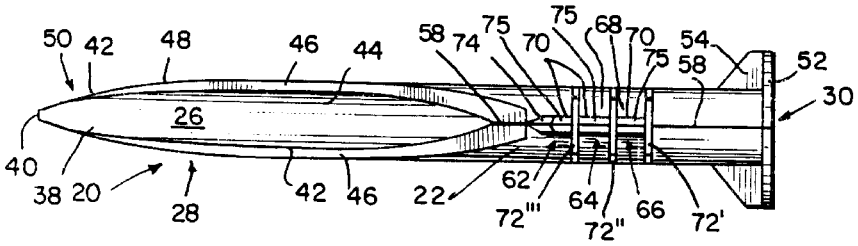
FIG. 4 shows a top elevations view of the expansion fastener of FIG. 2.

Tip end 40 of tapered portion 28 provides initial cutting penetration for fastener 20. As shown, tip end 40 has a flat, vertical end wall of height T, that height corresponding to the radial wall thickness of cylindrical body portion 22. On the other hand, as shown in FIGS. 2 and 3, tip end 40 includes a horizontal point of minimal width.

To further facilitate penetration, tapered portion 28 is preferably provided with cutting edges 42 on body portion 22. For example, fastener 20 includes an interior surface 44 lining passageway 26 and an exterior surface 48. Interior surface 44 can be provided with cutting edge 42 at its uppermost portion when the angular truncation of body portion 22 leaves a narrow, flat surface 46 across tapered portion 28 between interior surface 44 and exterior surface 48. Flat surface 46 can also be tapered toward tip end 40 as shown at 50 to reduce wall stress even more during initial penetration.

Base portion 30 is provided with a circumferential, radially extending shoulder or flange 52 to support the drive-in load (as, for example, caused by hammering) on fastener 20 during wall penetration. This flange is preferably relatively thin so as to minimize outward projection from the wall surface when the fastener is fully mounted. Flange 52 also serves as a stop or limit to the penetration of the wall by fastener 20 and as a stop or limit to the extent of insertion of the retention element. Radial ribs or flanges 54 are provided on body portion 22 and, for example, extend from flange 52 along longitudinal axis 24 toward tip end 40. Flanges 54 serve to stiffen flange 52 and assist in supporting drive-in load. Flanges 54 are also typically much shorter than rib 38 and, in combination with rib 38, serve to prevent rotation of the fastener with respect to the wall by slightly penetrating and engaging the wall when the fastener is fully in place. Base portion 30 is also provided with indicia 56 on its end face for indicating the angular orientation of fastener 20 about axis 24. It has been found that greater loads can typically be supported at some orientations of fastener 20 than at other positions.

Body portion 22 includes a split length 58 extending from base portion 30 to tapered portion 28. This split is, for example, longitudinally aligned and divides flange 52 and flange portion 32. Split length 58 permits expansion of body portion 22 to establish retention of the fastener within the wall. This expansion can be caused by insertion of a retention element 60 into passageway 26.

Flange portion 32 includes at least one pair of circumferentially [expandable] *and radially displaceable* elements to retain the fastener by engaging the back surface of the wall and/or enlarging the fastener such that it cannot be pulled back toward the front surface of the wall. As shown, three such pairs 62, 64, and 66 are provided. Each pair comprises two opposing retaining arms separated by split length 58. Each retaining arm includes a body element 68 and a flange element 70. These pairs are spaced apart along body portion 22 and are separated by lateral slices 72 in the body portion such that each pair is separately expandable *or circumferentially and radially displaceable*. Flange elements 70 project radially outward from and, as shown, longitudinally along body portion 22. Prior to expansion, elements 68 are generally continuous with body portion 22 and enclose a portion of passageway 26.

Flange portion 32 is longitudinally spaced apart from shoulder flange 52 by a distance approximately equal to the wall thickness such that shoulder flange 52 and flange elements 70 bound that wall on either side when fastener 20 fully penetrates the wall. In preferred embodiments of the present invention, various different wall thicknesses can be accommodated with the same fastener by specific dispositions of shoulder flange 52, flange elements 70 and slices 72. For example, the distance toward tip end 40 from shoulder flange 52 to first slice 72' would be ⅜" (0.95 cm), from shoulder flange 52 to second slice 72" would be ½" (1.27 cm), and from shoulder flange 52 to third slice 72"' would be ⅝" (1.58 cm). That arrangement would permit fastener 20 to be used with drywall boards of ⅜, ½" or ⅝" thickness. The width of slices 72 permits room for accommodating variations in wall thickness such as that caused by paint and/or wallpaper. Thus, expansion of flange portion 32 would not scrape material off of the back surface of the wall and thereby weaken the wall.

In the embodiment illustrated in FIG. 2, the wall thickness is equal to or just less than the distance between shoulder flange 52 and first slice 72'. In other applications if the wall thickness is greater, flange pairs 64 and/or 66 may not fully emerge from the hole created in the wall by penetration of the fastener. However, adequate retention of the fastener is available with at least one flange pair which emerges and is expandable along the back side of the wall. In applications where fastener 20 supports only minimal loads and/or expansion within the wall is permissible, adequate retention is available even if no flange pair emerges from the wall.

Flange elements 70 of flange pair 62 are provided with leading edges 74 which are formed so as to cut through the wall as fastener 20 is inserted. For example, leading edge 74 can be inclined approximately 45° with respect to axis 24 in both the horizontal and vertical planes. Once this cut is made the flange elements 70 of flange pairs 64 and 66 can readily follow through. In some embodiments, penetration can also be facilitated by providing tapered upper portions 75 on flange elements 70.

Expansion of flange portion 32 is accomplished through the use of reduced diameter portion 36 in passageway 26. Portion 36 includes a tapered or inclined face 76 open towards base portion 30. Retention element 60, for example, a threaded screw, is inserted within passageway 26 from the opening in base portion 30. Face 76 serves as a cam surface or ramp for initial adjustment engagement with the leading edges of retention element 60. As shown, split length 58 penetrates to reduced diameter portion 36. In addition, longitudinally extending slots 78 are provided along passageway 26 through portion 36. Preferably, slots 78 are coplanar with axis 24 and approximately level with the lowermost portions of slices 72. At the same time, slices 72 preferably extend approximately halfway through body portion 22. Thus, slots 78 can positively and uniformly locate the hinge base for each body element 68 to control the extent and manner of adjustment expansion.

In adjustment expansion for the arrangement of FIG. 2, retention element 60 slides over face 76 and forces each element of flange pair 66 *radially outwardly and circumferentially* apart. As retention element 60 continues in passageway 26 toward end tip 40, each element of flange pair 64 and then flange pair 62 is forced apart. The expansion of each of these flange pair elements is pivotal with respect to body portion 22 at slots 78 and enlarges the effective circumference of this portion of fastener 20. In certain embodiments, insertion of a sufficiently large retention element will also cause *radial* expansion of body portion 22 between flange portion 32 and base portion 30 within the wall to snugly embrace the wall material. Expansion of fastener 20 within the wall is also available where, for example, the wall thickness is sufficiently large that one or more flange pairs remain within the wall. In such circumstances the flange pairs can tend to expand toward the back surface of the wall to prevent withdrawal of fastener 20 toward the front surface of the wall. In this manner, retaining fastener 20 within the wall also secures the retention element to the wall.

Using a self lubricating and relatively inexpensive material such as Rynite SST35 to form fastener 20 and/or passageway 26 can significantly reduce the torque necessary to use threaded screws for adjustment expansion. Providing passageway 26 with a large diameter permits several different sized screws to be used as retention elements since adjustment need only result from engagement with reduced diameter portion 36. With *radial expansion and* circumferential [expansion] *displacement*, only minimal opening of the flange pair elements is needed to provide secure retention of the fastener.

It has been found that fastener 20 has greater load bearing capacity when [slit] *split length* 58 is at the top of body portion 22 and rib 38 is at the bottom such that the flange pairs spread apart above the lateral midline created by the plane of slits 78 and axis 24. This load-bearing capacity can be sufficiently large so as to enable fastener 20 to be used in ceiling applications.

Although the present invention has been described above in detail, the same is by way of illustration and example only and is not to be taken as a limitation on the present invention. The scope and content of the present invention are defined only by the terms of the claims appended hereto.

What is claimed is:

1. An expansion fastener *capable of being directly hammered, punched or screwed into a drywall board* for securing a retaining member, comprising:

a generally cylindrical, longitudinally extending *hollow* body portion *having a tip at one end for penetrating the drywall board and a base portion at the other end with a passageway extending therethrough between said tip end and base portion*;

said body portion including a *longitudinally extending* tapered portion [at one end thereof] *extending from the tip end towards the base portion for effecting a clean and gradual cut through the drywall board*;

said body portion including a flange portion [which expands circumferentially] *extending in the longitudinal direction of the body portion, said flange portion expands radially outwardly* in response to insertion of said retaining member into said body portion *and at least a portion of said flange portion is displaced circumferentially*; [and]

*said flange portion includes means facing toward said tip end for cutting through the drywall board as the fastener is inserted; and* prior to said expansion of said flange portion, said flange portion projects radially outward from said body portion.

2. The fastener according to claim 1 wherein said tapered portion is formed by an angular truncation [of one end] of said body portion *extending longitudinally from said tip end toward said base portion.*

3. The fastener according to claim 1 wherein said tapered portion includes a cavity for receiving debris caused by insertion of said fastener into [a] *said drywall* board [member].

4. The fastener according to claim 3 wherein [said body portion includes a generally longitudinal passageway therethrough and] said cavity includes a portion of said passageway.

5. The fastener according to claim 4 wherein said passageway includes a longitudinal restriction having an inclined face for initial engagement with said retaining member.

[6. The fastener according to claim 1 wherein said flange portion extends longitudinally with said body portion.]

7. The fastener according to claim 1 wherein said body portion includes an exterior surface, and further including a tapered longitudinal rib for reinforcing said body portion, said rib being disposed adjacent said exterior surface and radially extending from said body portion.

8. The fastener according to claim 1 wherein said body portion includes an exterior surface, and further including means connected to said exterior surface for preventing rotation of said body portion.

9. An expansion fastener *capable of being directly hammered, punched or screwed into a drywall board* for securing a retention member to [a] *said* board, comprising:

a generally cylindrical, longitudinally extending *hollow* body portion having *a tip end at one end for penetrating the drywall board and a base portion at the other end and* a substantially longitudinal passageway therethrough;

said body portion including a tapered means *extending from the tip end towards the base portion* for facilitating penetration of said board by said body portion;

said tapered means being formed by an angular truncation of [one end of] said body portion *extending from said tip end towards said base portion*;

said body portion including a retaining portion for preventing removal of said body portion from said board;

said retaining portion including a flange [member] *portion* radially projecting *outwardly* from said body portion and extending longitudinally therewith; [and] said [retaining] *flange* portion expands [circumferentially] *radially* in response to insertion of said retention member into said passageway *and moves circumferentially; and*

*said flange portion includes means facing towards said tip end for cutting through the drywall board as the fastener is inserted.*

10. The fastener according to claim 9 wherein said angular truncation exposes a portion of said passageway to receive board debris caused by said penetration of said board by said body portion.

11. The fastener according to claim 9 wherein said [retaining] *flange* portion expands *radially and moves* circumferentially adjacent and exterior of said board in said response to insertion of said retention member into said passageway.

12. The fastener according to claim 9 wherein said tapered means includes internal and external surfaces and board-cutting edges at said internal surface to facilitate said penetration of said board.

13. The fastener according to claim 9 wherein the angle of said truncation with respect to said body portion is established for a particular board composition such that drive-in penetration of said board by said body portion does not result in formation of a blow out region on said board.

14. The fastener according to claim 9 wherein the angle of said truncation with respect to the longitudinal axis of said body portion is less than 45 degrees.

15. The fastener according to claim 9 wherein [said board comprises drywall material and] the angle of said truncation with respect to the longitudinal axis of said body portion is less than 10 degrees.

16. The fastener according to claim 9 wherein said [body] *base* portion includes a base shoulder opposite said tapered means, said shoulder including second flange means for preventing rotation of said body portion.

17. The fastener according to claim 16 wherein said second flange means includes a plurality of radially projecting elements which extend longitudinally along said body portion from said shoulder.

18. The fastener according to claim 9 further including expansion means disposed within said passageway for moving said [retaining] *flange* portion in response to said insertion of said retention member into said passageway.

19. The fastener according to claim 18 wherein said expansion means is formed as a longitudinal restriction in said passageway having a ramped end for engaging said retention member.

20. The fastener according to claim 19 wherein said expansion means includes longitudinal slot means for defining [the] *a* base of said [retaining] *flange* portion.

21. The fastener according to claim 20 wherein said *means of said* flange [member] *portion* includes a forward cutting edge having an angle of inclination at least as steep as the angle of said truncation with respect to the longitudinal axis of said body portion.

22. The fastener according to claim 9 wherein said flange [member] *portion* includes at least one pair of initially adjacent, parallel [projection] *body and flange* elements *before being expanded* which move *radially outwardly and* circumferentially apart in response to said insertion of said retention member into said passageway.

23. The fastener according to claim 22 wherein said flange [member] *portion* includes a plurality of pairs of [projection] *said body and flange* elements spaced apart longitudinally along said body portion.

24. The fastener according to claim 23 wherein said plurality of pairs of [projection] *body and flange* elements are sequentially moved apart by said insertion of said retention member into said passageway.

25. The fastener according to claim 24 wherein said body portion includes a longitudinal split, said split being aligned between said pairs of [projection] *body and flange* elements [and providing means for said body portion to expand circumferentially in response to said insertion of said retention member into said passageway] *wherein as said body portion expands radially said body and flange elements of at least one of said pairs of body and flange elements move circumferentially apart.*

26. The fastener according to claim 9 wherein said body portion is formed from a moldable, plastic material.

27. A drive-in expansion fastener *capable of being directly hammered, punched or screwed into a drywall or plaster board* for securing a retention element to [a] *said* drywall or plaster board, comprising:

a generally cylindrical, longitudinally extending *hollow* body portion having *a tip end at one end for penetrating the drywall or plaster board and a base portion at the other end with* a longitudinal passageway *extending* therethrough *between said tip end and said base portion*;

said body portion including a tapered means *extending longitudinally and* having board-cutting edges for facilitating drive-in penetration of said board by said body portion;

said tapered means being formed as an angular truncation of [one] *said tip* end of said body portion;

the angle of said truncation with respect to said body portion being established such that penetration of said board by said body portion does not result in formation of a blow out region on said board;

[a base portion formed on said body portion at an end opposite said tapered means;]

said base portion including a radially *outwardly* extending shoulder;

said body portion including a retaining means longitudinally spaced apart from said shoulder for preventing removal of said body portion from said board;

said retaining means including a flange portion radially projecting *outwardly* from said body portion; [and]

*said flange portion includes means facing toward said tip end for cutting through the board as the fastener is inserted, and* an expansion means disposed within said passageway for [circumferentially] *radially* expanding said flange portion outwardly with respect to said body portion in response to insertion of said retention element into said passageway *and for circumferentially displacing said flange portion*.

28. The fastener according to claim 27 wherein said fastener is molded from a nylon material.

29. The fastener according to claim 27 wherein said retention element is threaded for rotatable insertion into said passageway and said passageway is formed from a self-lubricating material.

30. The fastener according to claim 27 wherein said passageway is longitudinally exposed by said angular truncation such that board material is received therein during said drive-in penetration of said board by said body portion.

31. The fastener according to claim 30 wherein said [retaining means] *flange portion* includes a plurality of pairs of spaced apart hinged members, at least one of said pairs [including said flanged portion] *being circumferentially displaceable apart as said flange portion is radially expanded*.

32. A drive-in expansion fastener *capable of being directly hammered, punched or screwed into a drywall or plaster board* for securing a retention element to [a] *said* drywall or plaster board, comprising:

a generally cylindrical, longitudinally extending *hollow* body portion having *a tip end at one end for penetrating the drywall or plaster board and a base portion at the other end and with* a longitudinal passageway *extending* therethrough;

said body portion including a *longitudinally extending* tapered means having board-cutting edges for facilitating drive-in penetration of said board by said body portion;

said tapered means being formed as an angular truncation of [one] *said tip* end of said body portion;

the angle of said truncation with respect to said body portion being established such that penetration of said board by said body portion does not result in formation of a blow out region on said board;

said passageway is longitudinally exposed by said angular truncation such that board material is received therein during said drive-in penetration of said board by said body portion;

[a base portion formed on said body portion at an end opposite said tapered means;]

said base portion including a radially *outwardly* extending shoulder;

said body portion including a retaining means longitudinally spaced apart from said shoulder for preventing removal of said body portion from said board;

said retaining means includes a plurality of pairs of spaced apart hinged members, at least one of said pairs including a flange portion radially projecting from said body portion;

the hinge base of said hinged members is formed by *a* longitudinal [slits] *split length* in said body portion; and an expansion means disposed within said passageway for moving said flange portion *circumferentially and radially* outwardly with respect to the circumference of said body portion in response to insertion of said retention element into said passageway.

33. The fastener according to claim 32 wherein said [body] *base* portion includes a circumferential base shoulder for receiving the impact of means for causing said drive-in penetration of said board by said body portion.

34. The fastener according to claim 33 wherein said shoulder includes visible indicia thereon for indicating the orientation of said fastener within said board.

35. The fastener according to claim 33 wherein said shoulder includes longitudinally extending projections for preventing rotation of said body portion with respect to said board after said drive-in penetration and during insertion of said retention element.

36. An expansion fastener *capable of being directly hammered, punched or screwed into a drywall board* for securing a retaining member *thereto*, comprising:

a generally cylindrical, longitudinally extending *hollow* body portion *having a tip end at one end for penetrating the drywall board and a base portion at the other end with a passageway extending therethrough between said tip and and base portion*;

said body portion including a *longitudinally extending* tapered portion [at one end thereof] *extending from the tip end towards the base portion for effecting a clean and gradual cut through the drywall board*;

said body portion including a flange portion which expands *radially and is displaced* circumferentially in response to insertion of said retaining member into said body portion;

said tapered portion includes a cavity for receiving debris caused by insertion of said fastener into [a] *said drywall* board [member];

[said body portion includes a generally longitudinal passageway therethrough;]

said cavity includes a portion of said passageway; and said passageway includes a longitudinal restriction having an inclined face for initial engagement with said retaining member*;*

*said flange portion includes means facing towards said tip end for cutting through the drywall board as the fastener is inserted; and*

*prior to said expansion of said flange portion, said flange portion projects radially outwardly from said body portion.*

37. The fastener according to claim 36 wherein said tapered portion is formed by an angular truncation of one end of said body portion.

38. The fastener according to claim 36 wherein said body portion includes an exterior surface, and further including a tapered longitudinal rib for reinforcing said body portion, said rib being disposed adjacent said exterior surface and radially extending *outwardly* from said body portion.

39. The fastener according to claim 36 wherein said body portion includes an exterior surface, and further including means connected to said exterior surface *adjacent said base portion* for preventing rotation of said body portion.

* * * * *